(No Model.)
C. DESMAZURES, Dec'd.
J. L. NORRIS, Administrator.
SECONDARY BATTERY.
No. 402,006. Patented Apr. 23, 1889.
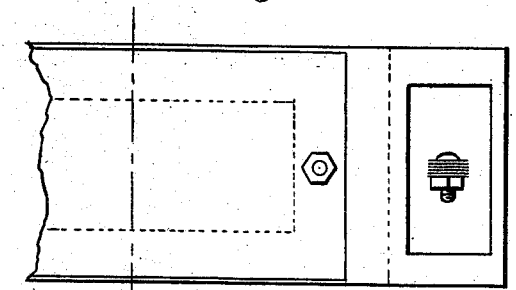
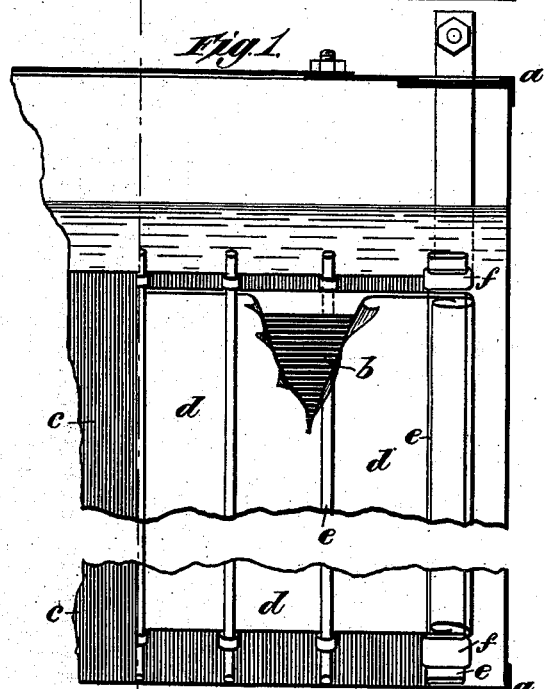
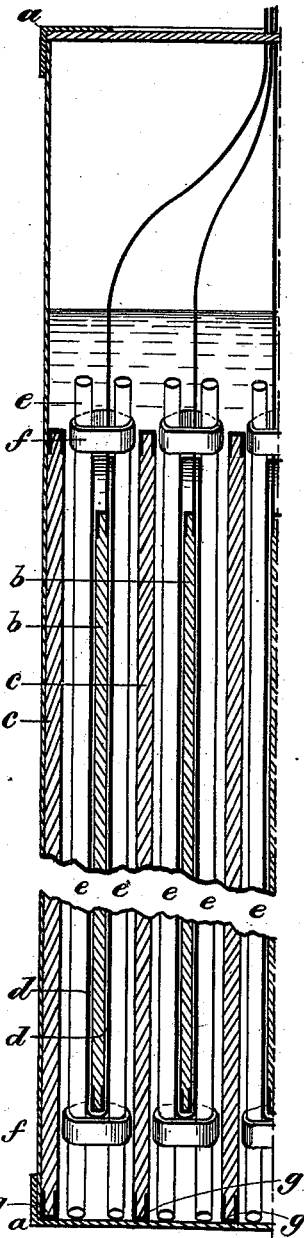
Witnesses,
Robt Emett,
Percy B. Hills.
Inventor
James L. Norris,
Administrator on the Estate of
Camille A. Desmazures,
deceased.

UNITED STATES PATENT OFFICE.

CAMILLE DESMAZURES, OF PARIS, FRANCE; JAMES L. NORRIS, ADMINISTRATOR OF SAID CAMILLE DESMAZURES, DECEASED, ASSIGNOR TO MARIE ANTOINETTE DESMAZURES, OF PARIS, FRANCE.

SECONDARY BATTERY.

SPECIFICATION forming part of Letters Patent No. 402,006, dated April 23, 1889.

Application filed March 31, 1887. Serial No. 233,175. (No model.) Patented in England June 15, 1886, No. 7,966, and March 21, 1887, No. 4,219; in Germany March 15, 1887, No. 41,995, and in France May 3, 1887, No. 183,285.

*To all whom it may concern:*

Be it known that I, CAMILLE DESMAZURES, a citizen of the French Republic, and a resident of Paris, France, have invented certain Improvements in Accumulators of Electricity or other Primary or Secondary Galvanic Batteries, (for which I have obtained Letters Patent in Germany, No. 41,995, dated March 15, 1887; in Great Britain, No. 7,966, dated June 15, 1886, and No. 4,219, dated March 21, 1887, and in France, No. 183,285, dated May 3, 1887,) of which the following is a specification.

The principle of the accumulator is based on a property of metals which is little known. When a metallic precipitate, whether chemical or galvanic, a metallic powder, or a metallic product of reduction is compressed in a metallic mold with an enormous pressure, (say from six to twelve hundred atmospheres per square inch,) the pure metal agglomerated in a solid form, but of a density varying from half to two-thirds of that of the melted metal, is obtained. The atomic porosity of the metal thus obtained gives it certain peculiar physical and chemical properties, among others that of carrying off oxygen or hydrogen with an extraordinary affinity, leaving at the same time in the metal all its electric conductibility.

In order to make the invention more easily understood, reference will be made to the accompanying drawings, in which—

Figure 1 is a longitudinal section of an apparatus constructed to embody my improvements. Fig. 2 is a plan view of the interior arrangement of such apparatus. Fig. 3 is a plan view of the lid, and Fig. 4 is a cross-section of the said apparatus.

In all the figures similar letters refer to corresponding parts.

$a\ a$ is a tinned vessel or recipient; $b\ b$, positive electrodes made of pure porous copper in sheets of two millimeters thick.

$c\ c$ are negative electrodes made either of tinned iron, of tinned wire stretched over a sheet of tinned iron, or of tinned or galvanized wire-gauze.

$d\ d$ are parchment-paper envelopes.

$e\ e$ are rods of glass supporting the parchment-paper envelopes by means of india-rubber rings $f\ f$. These glass rods $e\ e$ thus assure the requisite separation between the positive and negative poles.

If at the positive pole of the accumulator, arranged as above, there is placed a plate in a solid state of pure porous metal—say platinum, silver, cobalt or copper, nickel, manganese, aluminium, iron, &c.—obtained by the above process and possessing the aforesaid properties; if at the negative pole there is placed a plate of block-tin, tinned iron, some tinned wire wrapped around a sheet of tinned iron, or some tinned or galvanized wire-gauze to develop the surface of the negative; if an electrolytic liquid chlorate of soda and zincate of soda or potash is taken, in which liquid these two latter salts may be placed by any other alkaline salt obtained with a metallic oxide acting as an acid—as, for instance, stannate of soda or of potash, manganate of soda or potash—and if the whole (positive, negative, and liquid) be placed in a tinned box, $a\ a$, an accumulator will be obtained which will possess the following properties: If an electric current be passed from the positive to the negative in order to charge the apparatus, the oxygen set at liberty by the decomposition of the water is absorbed by the positive electrode, and not a bubble of gas is formed, the zinc or the electrolyte is precipitated upon the negative electrode, and the hydrogen of the water combines with the oxygen of the zincate. This is what is known as "galvanoplasty" or "electro-metallurgy." If the charge of the apparatus is stopped, if the circuit is closed, the zinc returns to a solution by the help of the oxygen of the positive electrode. Not a bubble of gas is formed. A very regular current, whether in ampères or in volts, is thus obtained. Practically speaking, the constancy is absolute. When the discharge is finished, the apparatus is again charged, then discharged, and so on *ad libitum*. The electrodes do not wear out or shrivel up, nor does the apparatus suffer other deteriorations. An accident may, however, happen for the reason of too sudden charging, the zinc may not be sufficiently adherent, and fall to the bottom of the jar. Therefore care is taken to connect the negative electrode with the tinned vessel, so that should the zinc fall it may always come in contact with the negative pole, and thus dissolve when discharged again. Moreover, the negative plates rest on the bottom of the vessel, as shown in the accompanying drawings.

It may be remarked that the chlorate of soda is employed in the electrolyte to give to the zinc an adherence to the negative and allow of charging quickly.

In order to set forth the novelty of the practical effect of the working of the apparatus, it cannot be done better than to show by the following table the discharge obtained with the apparatus No. 4 of the accumulators illustrated in the accompanying drawings:

TABLE SHOWING THE DISCHARGE OF AN ACCUMULATOR, MODEL NO. 4.

| Time, (p. m.) | Ampères. | Volts. |
|---|---|---|
| 9.30 | 33.30 | 0.86 |
| 9.45 | 34.41 | 0.86 |
| 10.00 | 34.63 | 0.86 |
| 10.15 | 34.96 | 0.86 |
| 10.30 | 35.52 | 0.86 |
| 10.45 | 36.07 | 0.86 |
| 11.00 | 36.63 | 0.86 |
| 11.15 | 36.63 | 0.86 |
| 11.30 | 36.63 | 0.86 |
| 11.45 | 36.74 | 0.86 |
| 12.00 | 36.74 | 0.86 |
| 12.15 | 36.74 | 0.86 |
| 12.30 | 36.74 | 0.86 |
| 12.45 | 36.74 | 0.86 |
| 1.00 | 36.74 | 0.86 |
| 1.15 | 36.74 | 0.86 |
| 1.30 | 36.74 | 0.86 |
| 1.45 | 36.74 | 0.86 |
| 2.00 | 36.09 | 0.86 |
| 2.15 | 36.07 | 0.86 |
| 2.30 | 36.07 | 0.86 |
| 2.45 | 36.07 | 0.86 |
| 3.00 | 36.07 | 0.86 |
| 3.15 | 36.07 | 0.86 |
| 3.30 | 36.07 | 0.86 |
| 3.45 | 36.07 | 0.86 |
| 4.00 | 36.07 | 0.86 |
| 4.15 | 35.74 | 0.86 |
| 4.30 | 35.63 | 0.86 |
| 4.45 | 35.40 | 0.86 |
| 5.00 | 35.40 | 0.86 |
| 5.15 | 35.18 | 0.86 |
| 5.30 | 35.18 | 0.86 |
| 5.45 | 35.07 | 0.86 |
| 6.00 | 34.85 | 0.86 |
| 6.15 | 34.41 | 0.86 |
| 6.30 | 34.29 | 0.86 |
| 6.45 | 33.85 | 0.86 |
| 7.00 | 33.18 | 0.86 |
| 7.15 | 33.18 | 0.86 |
| 7.30 | 32.19 | 0.86 |
| 7.45 | 32.19 | 0.86 |

Total, 1,489.83

*Remarks.*—This accumulator is formed of five positive plates made of pure porous copper and six negative plates of tinned iron, weighing altogether about four and one-half kilograms. The electrolyte is composed of chlorate of soda with zincate of soda or of potash. The total weight of the apparatus is eighteen kilograms, including all accessories, such as plates, liquid, vessels, &c. This accumulator receives a charge of three hundred and seventy-two ampères at the rate of eighteen ampères per hour. It is discharged after seventeen hours rest. Total discharge per hour $\frac{1489.83}{4}$, or three hundred and seventy-two ampères. The production in ampères has been equal to the charge.

The electro-motive power obtained during the discharge is, as usual, subject to a certain extent to some variations, depending on the temperature, the intensity given out, the resistance, &c.; but on the whole the result in utilizable watts remains about the same.

In case it is feared that the oxygen may form, with the positive, an oxide capable of dissolving in the electrolyte, and thus risk precipitating its metal, with the zinc, on the negative, (which would take away all adherence from the zinc and destroy the regularity of the discharge,) care should be taken to inclose the positive electrode in a parchment-paper envelope, $d\ d$, stretched out and secured by means of glass rods $e\ e$, connected by means of india-rubber rings $f\ f$. These rods also serve to keep the plates at the right distance apart from each other—viz., five millimeters—and to support and insulate the positives. It is in this manner that the apparatus represented in the accompanying drawings is constructed, the positive being composed of stout plates of pure porous copper.

It may be remarked that the formation of black oxide of copper, known as "oxide of copper" or "cupric oxide," is so injurious that before charging the apparatus it is of vital importance to get rid of the oxide which is produced in the plates by contact with the air in the course of their manufacture. For this purpose, the first time the apparatus is charged a current is passed in the contrary direction from the negative to the positive, in order that the hydrogen produced may reduce the oxide of the positive.

What is claimed, and desired to be secured by Letters Patent of the United States, is—

1. In an accumulator or secondary battery, the combination, with an alkaline liquid, of pure porous metallic plates, substantially as described.

2. In an accumulator in which an alkaline liquid is employed at the positive pole, the positive electrodes $b\ b$, composed of pure porous copper, substantially as described.

3. In an accumulator, the combination, with an alkaline liquid and pure porous-metal plates, of parchment-paper envelopes for said plates, whereby a metal may be employed whose oxide might dissolve in the electrolyte, substantially as described.

4. In an accumulator in which an alkaline liquid is employed, the electrolyte liquid composed of chlorate of soda with zincate of soda or of potash, substantially as described.

5. In an accumulator in which an alkaline liquid is used, the combination of the glass rods $e\ e$ and india-rubber rings $f\ f$ to separate and support the positives and negatives.

In testimony whereof I have signed my name to this specification in the presence of two subscribing witnesses.

CAMILLE DESMAZURES.

Witnesses:
 LE BRUN DE VIRLOY,
 G. LOMBARD.